(12) United States Patent
Lu

(10) Patent No.: US 11,897,707 B2
(45) Date of Patent: Feb. 13, 2024

(54) TRANSPORT TRAY

(71) Applicant: TRIPLE WIN TECHNOLOGY(SHENZHEN) CO.LTD., Shenzhen (CN)

(72) Inventor: Guang-Shun Lu, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 668 days.

(21) Appl. No.: 17/105,565

(22) Filed: Nov. 26, 2020

(65) Prior Publication Data

US 2021/0387819 A1    Dec. 16, 2021

(30) Foreign Application Priority Data

Jun. 12, 2020  (CN) .......................... 202021082764.7

(51) Int. Cl.
 *B65G 49/05*  (2006.01)
 *H01F 7/02*  (2006.01)
 *B65G 69/16*  (2006.01)

(52) U.S. Cl.
 CPC .............. *B65G 49/05* (2013.01); *H01F 7/02* (2013.01); *H01F 7/0247* (2013.01); *B65D 2313/04* (2013.01); *B65G 69/16* (2013.01)

(58) Field of Classification Search
 CPC .. B65D 71/70; B65D 81/133; B65D 2313/04; A47G 2023/0666; B65G 49/05; B65G 49/06; B65G 69/16; H01F 7/0247
 See application file for complete search history.

(56) References Cited

U.S. PATENT DOCUMENTS

| | | | |
|---|---|---|---|
| 7,467,440 B2 * | 12/2008 | Seidler | B65D 51/04 16/320 |
| 2014/0251867 A1 * | 9/2014 | Castaneda | B65B 5/04 53/472 |
| 2015/0230520 A1 * | 8/2015 | Barrett | A24F 17/00 206/349 |
| 2019/0059557 A1 * | 2/2019 | Kehoe | A45D 40/24 |
| 2019/0110578 A1 * | 4/2019 | Maurin | A45D 40/24 |
| 2020/0039699 A1 * | 2/2020 | Wu | B65D 43/0202 |

FOREIGN PATENT DOCUMENTS

| | | | |
|---|---|---|---|
| CN | 109398952 A | * | 3/2019 |
| KR | 20-0460308 | * | 5/2012 |

* cited by examiner

*Primary Examiner* — Dean J Kramer
(74) *Attorney, Agent, or Firm* — ScienBiziP, P.C.

(57) ABSTRACT

A transport tray includes a carrier, a base plate, and a fixing member. The carrier is used to hold products. The base plate is provided with a groove. The carrier is received in the groove. The base plate and the fixing member are magnetic. At least a portion of the carrier is located between the base plate and the fixing member.

16 Claims, 4 Drawing Sheets

TRANSPORT TRAY

FIELD

The subject matter herein generally relates to a transport tray for transporting products.

BACKGROUND

During transport of certain fragile items (such as glass), the items are usually transported in pallets. However, during transport, loading, or unloading, the pallets are susceptible to shaking due to external impact, which may scatter or break the items.

BRIEF DESCRIPTION OF THE DRAWINGS

Implementations of the present disclosure will now be described, by way of embodiments, with reference to the attached figures.

DETAILED DESCRIPTION

Figure 1:
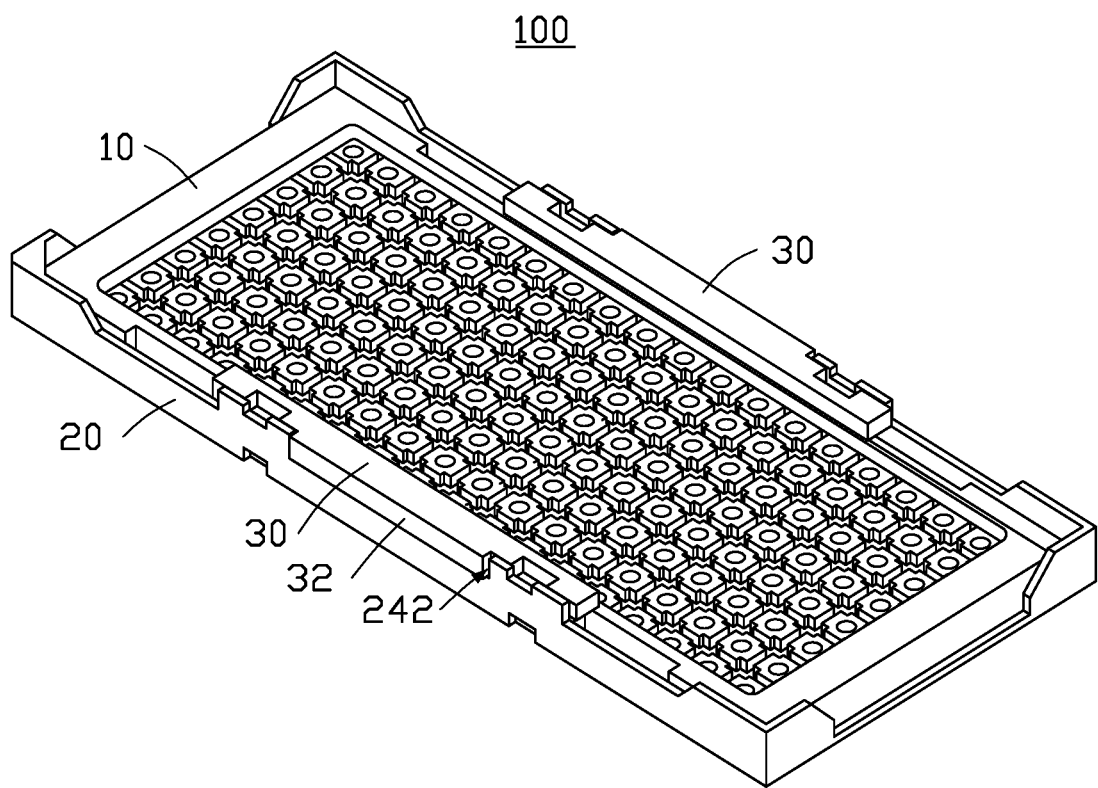
FIG. 1 is a schematic perspective diagram of a transport tray according to an embodiment of the current disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 shows an embodiment of a transport tray 100 that can be used to hold objects during transport. For example, the transport tray 100 is used to hold glass products during transport, so as to prevent the glass products from shaking due to external impact.

The transport tray 100 includes a carrier 10, a base plate 20, and a fixing member 30. The base plate 20 interacts with the fixing member 30 to fix the carrier 10 to prevent the products from being scattered due to an external impact on the carrier 10 during transport.

Figure 2:
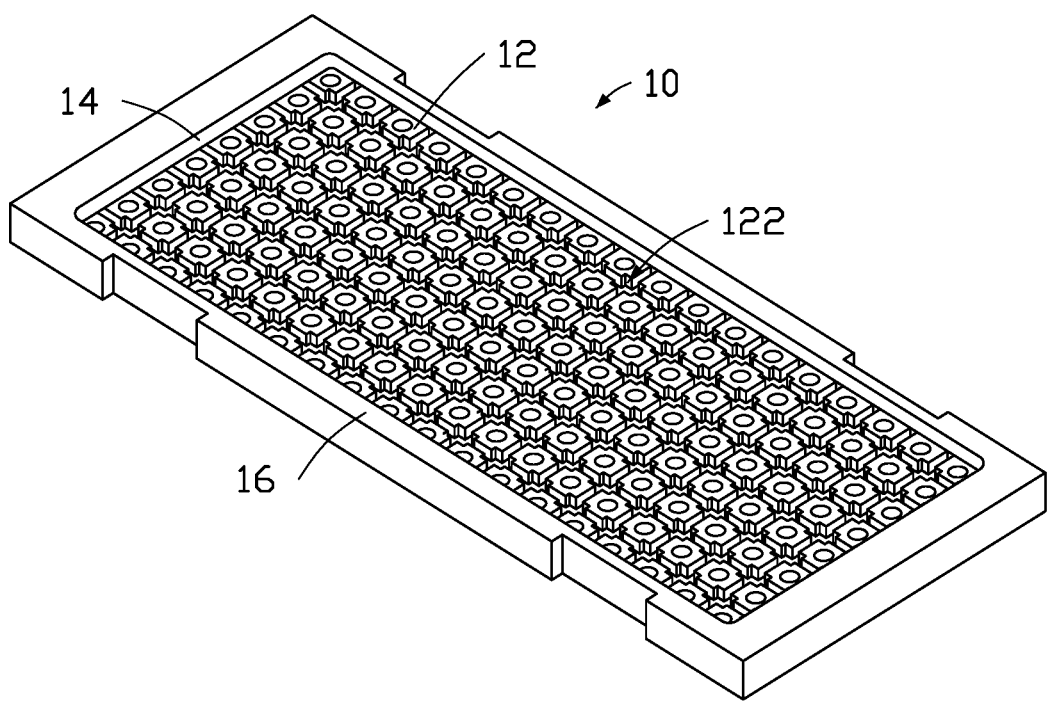
FIG. 2 is a schematic perspective diagram of a carrier shown in FIG. 1.

Referring to FIG. 2, the carrier 10 includes a bottom wall 12 and a side wall 14. The side wall 14 surrounds a periphery of the bottom wall 12. In one embodiment, the bottom wall 12 has a substantially rectangular shape, and a number of the side walls 14 is four. In other embodiments, the shape of the bottom wall 12 and the number of the side walls 14 can be set according to requirements.

The bottom wall 12 is provided with a plurality of receiving grooves 122. The receiving grooves 122 are arranged side-by-side in one or more rows. Each receiving groove 122 is used for receiving an object to be transported (such as glass), and a size of the receiving groove 122 matches a size of the object to be transported.

The side wall 14 is provided with an extension portion 16 extending away from the side wall 14. The extension portion 16 can be used for carrying the carrier 10 during transport. In addition, the extension portion 16 can facilitate interaction between the base plate 20 and the fixing member 30 for fixing the carrier 10.

Figure 3:
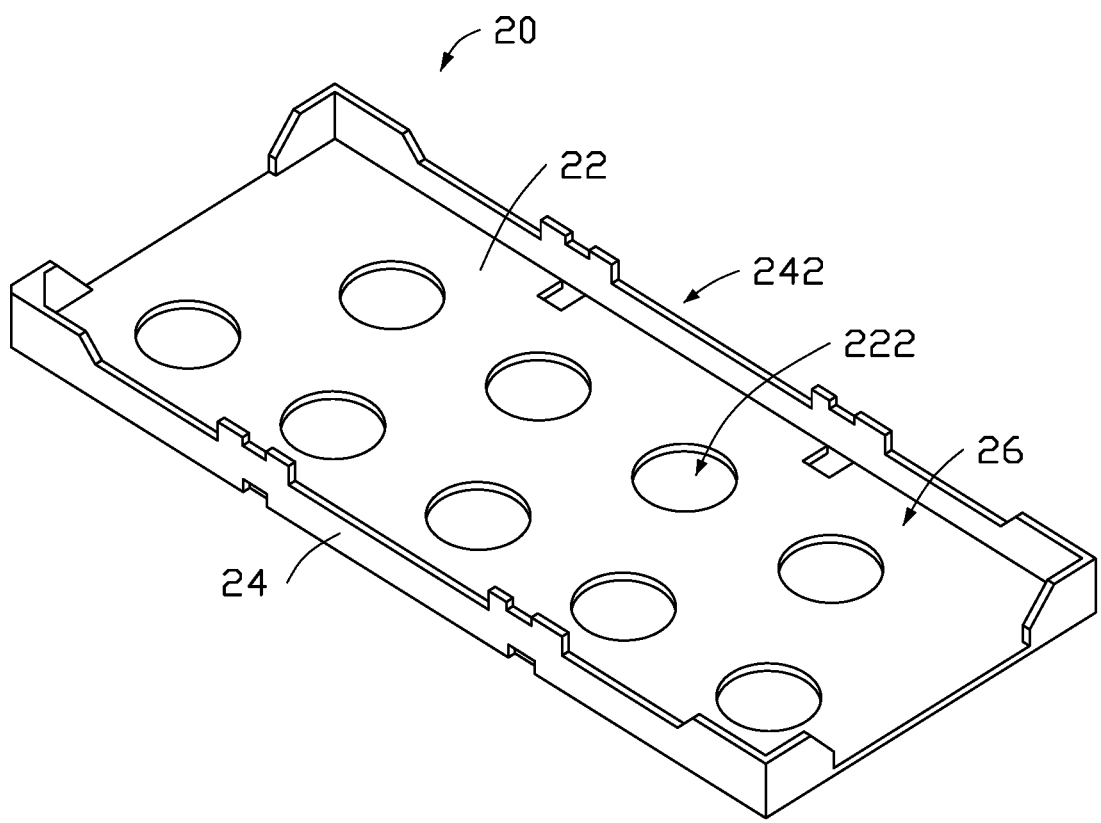
FIG. 3 is a schematic perspective diagram of a base plate shown in FIG. 1.

Referring to FIG. 3, the base plate 20 includes a bottom plate 22 and a side plate 24. The side plate 24 surrounds the bottom plate 22, and the bottom plate 22 and the side plate 24 cooperatively define a groove 26. A size of the groove 26 matches a size of the carrier 10 so that the carrier 10 is received in the groove 26.

The fixing member 30 is substantially elongated rectangular-shaped. The fixing member 30 and the base plate 20 are magnetic. The fixing member 30 and the base plate 20 magnetically attract each other, and at least a portion of the carrier 10 is fixedly located between the base plate 20 and the fixing member 30. A number of the fixing member 30 may be one or more. In one embodiment, the number of the fixing member 30 is two.

Specifically, the carrier 10 is placed in the groove 26. A number of the extension portions 16 is two, and the two fixing members 30 are respectively placed on the two extension portions 16 of the carrier 10. The base plate 20 and the fixing members 30 magnetically attract each other to fix the carrier 10. The carrier 10, the base plate 20, and the fixing member 30 are assembled together to form the transport tray 100, and a plurality of the transport trays 100 can be arranged in a stacked arrangement.

Further, the bottom plate 22 is provided with one or more through holes 222. The one or more through holes 222 reduce an adhesion force between the carrier 10 and the base plate 20 so that vibration of the carrier 10 is reduced when placed or taken out of the groove 26.

Further, a notch 242 is provided on the side plate 24. A number of the notch 242 may be one or more. The fixing member 30 is provided with a protrusion 32. A shape of the protrusion 32 matches a shape of the notch 242, and the protrusion 32 is received in the notch 242 to further enhance a fixing effect between the base plate 20 and the fixing member 30.

Figure 4:
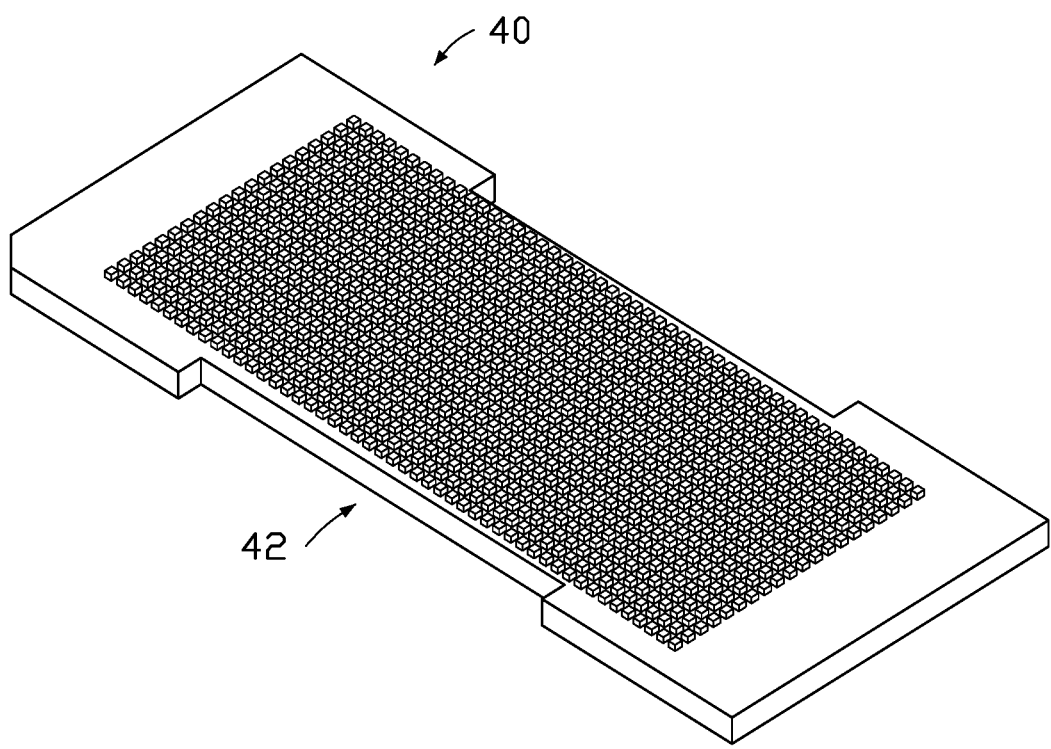
FIG. 4 is a schematic perspective diagram of a cover of the transport tray.

Referring to FIG. 4, the transport tray 100 further includes a cover plate 40. A size of the cover plate 40 matches a size of the base plate 20, and the cover plate 40 is detachably covered on the base plate 20. The carrier 10 is received in a space between the cover plate 40 and the base plate 20 to further prevent the objects from scattering due to an external impact. For example, when the fixing member 30 and the carrier 10 contact each other during assembly, the carrier 10 may vibrate, and the cover plate 40 covered on the carrier 10 prevents the products from being scattered or broken.

The cover plate 40 is provided with at least one opening 42 defined on a side of the cover plate 40. The opening 42 is used to receive the corresponding fixing member 30. In one embodiment, the cover plate is provided with two openings 42 on opposite sides of the cover plate 40, respectively, and the two fixing members 30 are respectively received in the two openings 42 to limit movement of the cover plate 40 in a plane of the cover plate 40.

The cover plate 40 is made of a material having a low hardness, such as a resin material, so that the cover plate 40 acts as a buffer when the transport tray 100 is impacted. In one embodiment, the cover plate 40 is made of polymethyl methacrylate (PMMA).

In summary, the carrier 10 is fixed between the base plate 20 and the fixing member 30, which can effectively prevent the products on the carrier 10 from being scattered or broken due to external impact during transport.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A transport tray used for transporting objects, the transport tray comprising:
    a carrier configured for holding the objects;
    a base plate provided with a groove configured to receive the carrier, and the base plate being magnetic; and
    a fixing member, the fixing member being magnetic, wherein at least a portion of the carrier is between the base plate and the fixing member to fix the carrier;
    a cover plate detachably covered on the base plate, wherein an opening defined on a side of the cover plate, and the opening is configured for receiving the fixing member.

2. The transport tray of claim 1, wherein:
    the carrier comprises a bottom wall and a side wall;
    the side wall surrounds a periphery of the bottom wall;
    a plurality of receiving grooves is defined on the bottom wall; and
    each of the plurality of receiving grooves is configured for receiving one of the objects.

3. The transport tray of claim 2, wherein:
    an extension portion protrudes outward from the peripheral edge of the side wall.

4. The transport tray of claim 3, wherein:
    the extension portion is between the base plate and the fixing member.

5. The transport tray of claim 1, wherein:
    the base plate comprises a bottom plate and a side plate;
    the side plate surrounds a periphery of the bottom plate; and
    the side plate and the bottom plate cooperatively define the groove.

6. The transport tray of claim 5, wherein:
    at least one through hole is defined on the bottom plate.

7. The transport tray of claim 5, wherein:
    a notch is defined on the side plate; and
    a protrusion of the fixing member is configured to be received in the notch.

8. The transport tray of claim 1, wherein:
    the transport tray is made of a resin material.

9. A transport tray comprising:
    a carrier used to hold a plurality of products;
    a base plate provided with a groove, and the carrier received in the groove;
    a cover plate detachably covered on the base plate; and
    a fixing member magnetically attached to the base plate; wherein:
    at least a portion of the carrier is located between the base plate and the fixing member;
    the cover plate is provided with an opening defined on a side of the cover plate, and the opening is used to receive the fixing member.

10. The transport tray of claim 9, wherein:
    the carrier comprises a bottom wall and a side wall;
    the side wall surrounds a periphery of the bottom wall;
    the bottom wall is provided with a plurality of receiving grooves; and
    each of the plurality of receiving grooves is used for receiving a product.

11. The transport tray of claim 10, wherein:
    a peripheral edge of the side wall is provided with an extension portion protruding outward.

12. The transport tray of claim 11, wherein:
    the extension portion is located between the base plate and the fixing member.

13. The transport tray of claim 12, wherein:
    the base plate comprises a bottom plate and a side plate;
    the side plate surrounds a periphery of the bottom plate; and
    the side plate and the bottom plate cooperatively define the groove.

14. The transport tray of claim 13, wherein:
    the bottom plate is provided with at least one through hole.

15. The transport tray of claim 14, wherein:
    the side plate is provided with a notch; and
    the fixing member is provided with a protrusion received in the notch.

16. The transport tray of claim 9, wherein:
    the transport tray is made of a resin material.

* * * * *